INVENTOR.
VICTOR DEL ROSSO

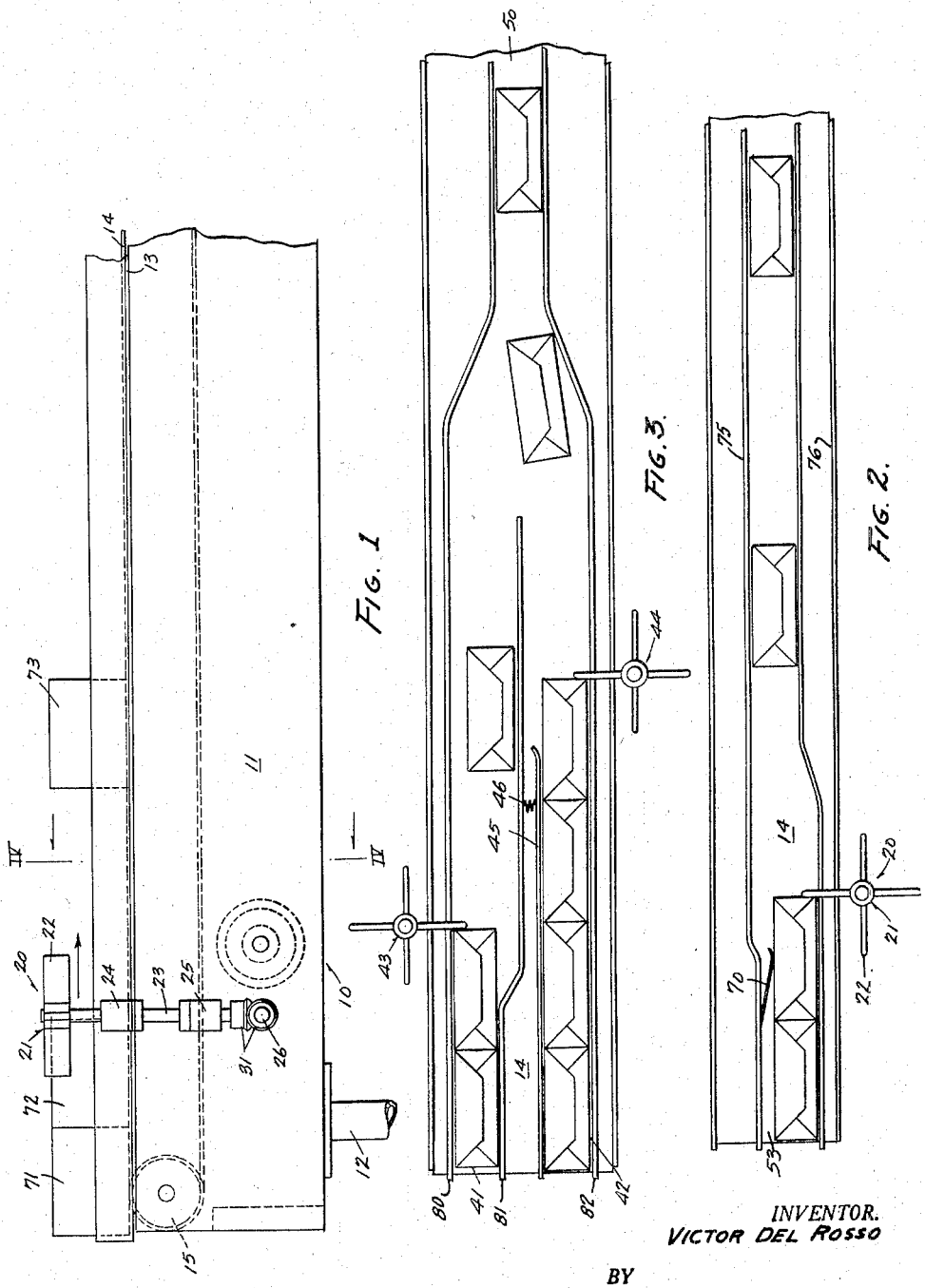

Oct. 6, 1959  V. DEL ROSSO  2,907,443
ROTARY FEEDING AND TIMING DEVICE
Filed Sept. 10, 1956  3 Sheets-Sheet 3

INVENTOR.
VICTOR DEL ROSSO
BY
Bean, Brooks, Buckley & Bean.
ATTORNEYS

United States Patent Office 2,907,443
Patented Oct. 6, 1959

2,907,443

ROTARY FEEDING AND TIMING DEVICE

Victor Del Rosso, Ithaca, N.Y., assignor to Hi-Speed Checkweigher Company, Inc., Ithaca, N.Y.

Application September 10, 1956, Serial No. 608,988

6 Claims. (Cl. 198—34)

My invention relates in general to rotary feeding and timing devices and in particular to a device for feeding packages or the like at spaced intervals for subsequent treatment.

The principal object of my invention is to provide a device whereby packages may be fed by rotary motion, and one which shall occupy but small space.

A further object is to provide a bladed index device whereby packages may be fed one at a time at a definite spaced relation with each other.

Another object is to provide a device of such a nature that one line of packages can be divided into two or more lines or by which two or more lines of packages may be converged into a single line of packages.

Moreover, my device is very compact and can be made to operate in a very limited space and does away with many cumbersome parts usually necessary in feeding devices of this type.

Furthermore, my device is so reliable in operation that jamming of the packages during the feeding process is relatively improbable.

The above objects and advantages have been accomplished by the device shown in the accompanying drawings, of which:

Fig. 1 is a side elevation of my device assembled to a package feeding table;

Fig. 2 is a plan view thereof;

Fig. 3 shows a modified table in which two feeding devices are employed;

Figure 5:
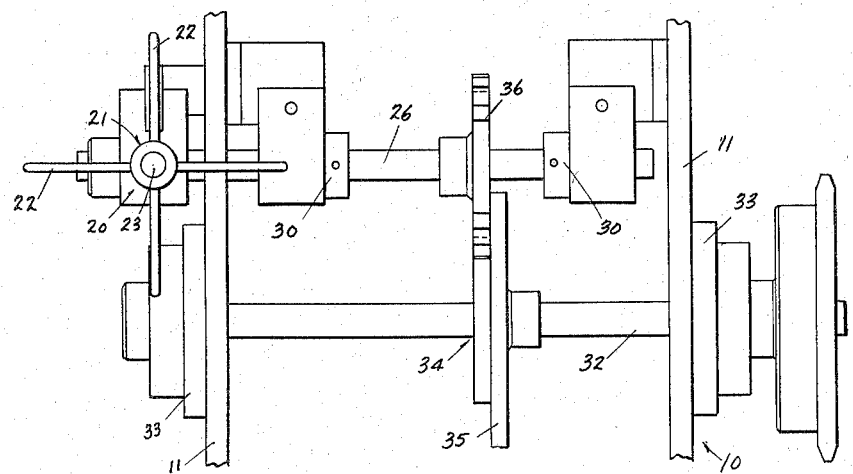
Fig. 5 is a plan view of the device with the table cover and feeding belt removed for clearness of illustration.
Figure 6:
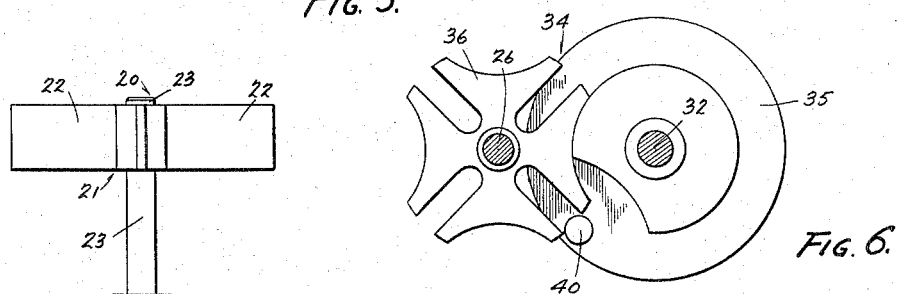
Fig. 6 is an enlarged end sectional view taken on line VI—VI of Fig. 4, showing the intermittent driving mechanism.
Figure 4:
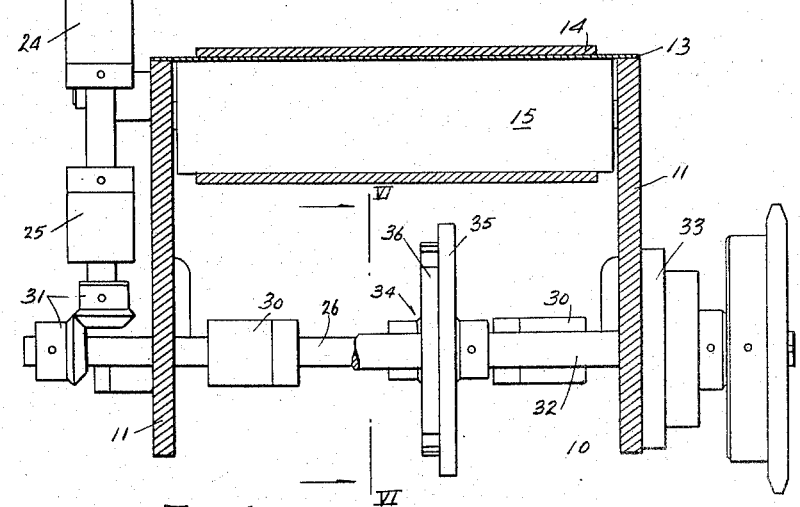
Fig. 4 is an enlarged sectional end view taken on line IV—IV of Fig. 1.

My device is mounted upon a table 10 comprising side rails 11, suitably supported by legs 12. The side rails are held in spaced relation by suitable means (not shown), and a top cover 13 is extended across between the rails thereby forming a top for the table. Movable over the top of the table is a conveyor belt 14 which is mounted at one end upon a suitable roller 15 and at the other end by a similar roller (not shown). Suitable means (not shown) are provided for driving the conveyor belt which is actuated in the direction indicated by the arrow in Fig. 1. Chutes for guiding the packages as they are traveling over the belt are provided by chute walls 78 and 79 in the form of Fig. 2 and chute walls 80, 81, 45 and 82 in the form of invention of Fig. 2.

The release mechanism of my invention which is of a rotary nature, comprises an index assembly 20 including an index wheel 21 having a plurality of blades 22. The index wheel is so positioned that the blades are intermittently movable over the top of the conveyor belt one at a time, and it is mounted upon a vertical index shaft 23 rotatably supported by suitable bearings 24 and 25. The index shaft is driven by means of a follower shaft 26 mounted in suitable bearings 30 supported by the side rails 11 of the table. The index shaft and the follower shaft are rotatively connected together preferably by means of a pair of bevel gears 31. The chute walls at a point opposite the index wheel are preferably spaced apart a distance slightly greater than the longitudinal width of the packages being handled so as to permit some lateral movement of the foremost package as it is being moved forwardly upon the belt after being released by the wheel. When it is desired to have the space between the walls equal to the width of the package, the wall farthest from the wheel may be made flexible as shown in Fig. 3.

The index assembly is driven by means of a drive shaft 32 rotatably mounted in suitable bearings 33 carried by the side rails 11 of the table. The drive shaft and follower shaft are mounted in spaced relation with each other and are connected together in driving relation by means of a Geneva intermittent gear mechanism 34 comprising a constantly driven pin disc 35 and a slotted disc 36. The pin disc is mounted upon the shaft 32 and through the medium of the driving pin 40 serves to intermittently rotate the slotted disc 36 one-quarter of a revolution for each complete revolution of the pin disc. It will be seen that through the medium of this Geneva mechanism, the follower shaft 26 and hence the feeder wheel 21 will be maintained in fixed relation while the pin disc of the wheel is being rotated through its inactive cycle, whereby packages being fed to the index wheel will be maintained in stationary position on top of the moving belt until the wheel is again rotated by the actuation of the slotted disc of the Geneva mechanism.

Figures 7, 8:
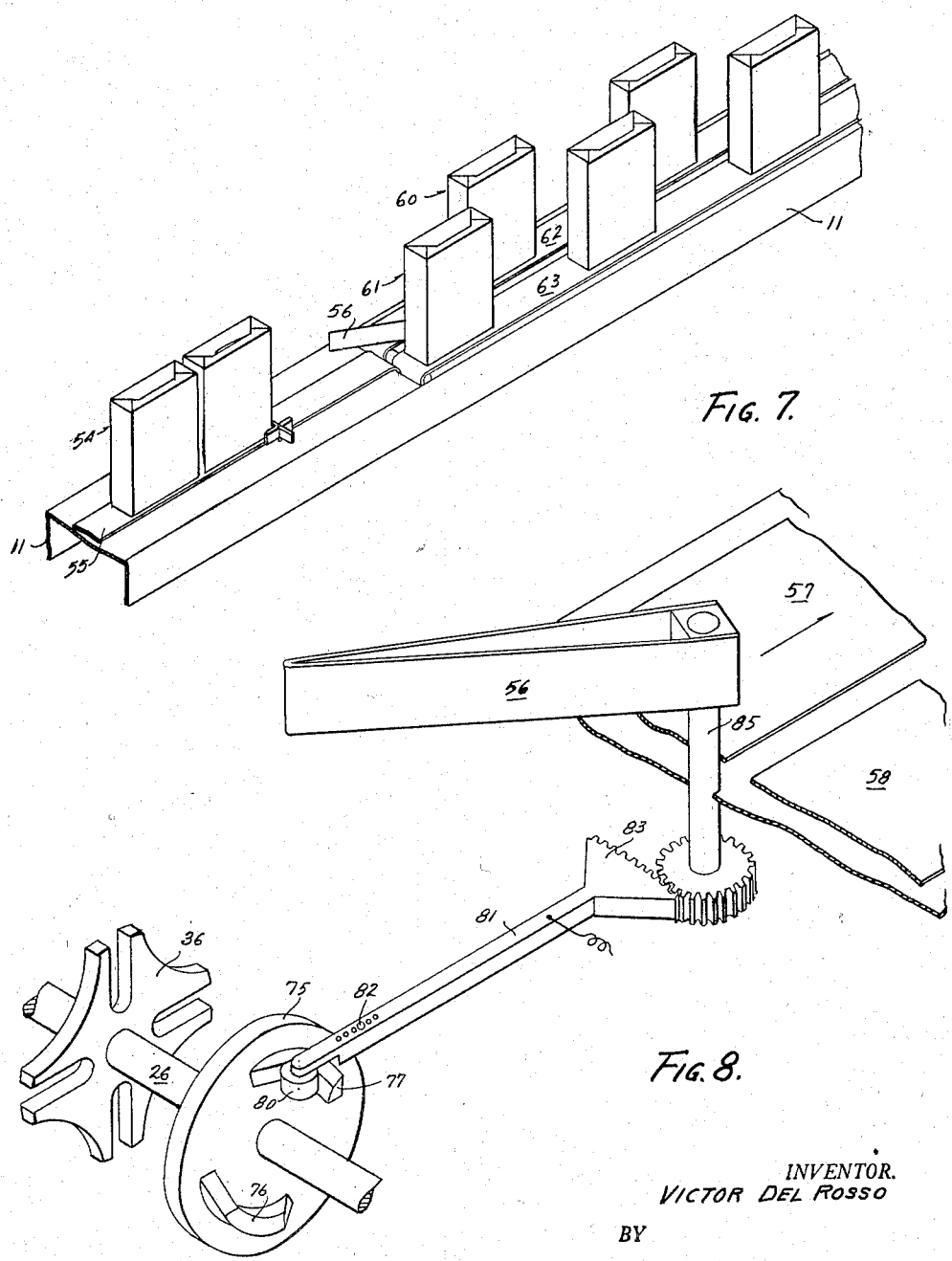
Fig. 7 is an isometrical view of a modified form of invention.
Fig. 8 is a similar view showing a typical form of gate operating mechanism.

As hereinbefore set forth, in my device, when used to divide one line of packages into two lines as in the form of invention shown in Fig. 7, a single line 54 of packages is fed by means of the belt 55 which terminates in its travel at or slightly beyond the forward end of a deflector gate 56. The deflector gate divides the single row of packages into double rows 60 and 61 by deflecting alternate packages onto belts 62 and 63. In this form of invention, only one feeder wheel 20 is used. In Fig. 2 a belt 53 is provided and a spring 70 may be provided for urging the packages toward the side of the chute where the index wheel is located.

Referring to Fig. 8, where I show one form of mechanism for actuating the gate 56, a cam disc 75 is mounted upon the follower shaft 26 carrying the slotted disc 36 of the Geneva mechanism, and is intermittently rotated therewith. This disc is provided with two oppositely arranged cam faces 76 and 77, which are alternately engaged by a roller 80 carried at the outer end of an actuating rod 81. This rod is provided with an adjustable pivot 82 and carries a segmental gear 83 at its outer end. In mesh with this gear is a gear pinion 84 which is carried by the vertical shaft 86 of gate 56. This shaft is supported by suitable bearings (not shown). The cams 76 and 77 are so arranged in relation to the slotted disc 36 that when the disc is in its dwell position, the roller 80 is alternately disposed upon a cam or upon the cam disc 75 between the cams, thereby alternately swinging the gate to direct the oncoming packages alternately into lines 60 and 61 and upon conveyor belts 62 and 63.

My index device, when used in multiple, is applicable to the indexing of a number of lines of packages, such as shown in Fig. 3 of the drawings where two feeder chutes 41 and 42 are provided. An index wheel 43 controls the packages coming through the chute 41, and a similar index wheel 44 controls packages coming through the chute 42. If desired, the wall 45 of the chute 42 may be flexible and a spring 46 may be provided between this wall and the wall 81 for pressing the wall 45 lightly against the packages so as to guide them into the path of the index wheel and to provide for slight lateral motion of the advance package when released. As shown in this figure, the feeder wheels are placed at separate points in the travel of the packages and they are so timed that packages from each chute will be alternately released for feeding by the moving belt 14 and converged into a single line in the chute 50.

From the foregoing, it will be clear that packages 71 and 72 shown in Fig. 1 are being urged against the feeder wheel 21. This wheel is intermittently locked against movement by the Geneva mechanism, but when the slotted disc 36 is actuated, the index wheel 21 will be turned and the package 72 will be permitted to move forwardly upon the conveyor belt 14. Since the pitch of the blades is such that the distance between the outer ends thereof is substantially less than the longitudinal width of the package, it is readily seen that the next succeeding blade of the wheel will be brought against the upstream side of the package 72 and will slightly push this package in a lateral direction against the spring 70, thus positioning the next blade in front of the package 71. When the wheel comes to rest, this second blade will be in front of the package 71 and will thus interrupt its travel with the belt and thereby hold it until such time as the wheel is again rotated. The package 72 will then be moved forwardly along the conveyor belt as indicated by the package 73 whereupon the feeder mechanism will again be actuated to permit the package 71 to move along the belt. The number of packages fed per minute is governed by the number of revolutions of the slotted disc of the Geneva mechanism, and hence the rotation of the index wheel. The space between the packages is governed by the speed of the belt carrying the packages away from the index and by the speed of intermittent operation of the slotted disc of the Geneva mechanism. The packages being handled by my device are intermittently stopped against movement with the continuously moving belt by the blades of the index wheel and each successive package is fully released by the intermittent rotation of the feeder wheel so that jamming of the packages at this point is relatively improbable.

While I have shown means for causing the rotation of the gate shaft through the medium of the gears, it is obvious that the shaft may be oscillated by hydraulic means operated electrically through the medium of microswitches actuated by the cams 76 and 77. These and other modifications may be made without departing from the spirit of my invention or the scope of the appended claims.

What is claimed is:

1. A rotary device for feeding rectangular packages at a given rate and at spaced intervals, comprising a table having a supporting top, a conveyor belt continuously moving across said top for supporting and feeding said packages, a vertical shaft carried by said table, an index wheel mounted upon said shaft and disposed above said top, said wheel having a plurality of equidistantly spaced blades for periodically interrupting the movement of said packages, said blades being so pitched that the space between adjacent ends thereof is substantially less than the longitudinal width of said packages, said packages being presented to said wheel by said belt, a horizontally arranged follower shaft rotatably mounted upon said table, means connecting said vertical shaft and said follower shaft, a horizontally arranged rotating drive shaft carried by said table, and a Geneva mechanism connecting said drive shaft to said follower shaft to cause intermittent rotation of said feeder wheel to release only one package at a time for conveyance to said belt.

2. A rotary device for feeding rectangular packages at a given rate and at spaced intervals, comprising a table having a supporting top, a conveyor belt continuously moving across said top for supporting and feeding said packages, an index wheel having a plurality of spaced blades arranged above said table and engageable one at a time with successive packages, the foremost package being interrupted in its travel on said belt by the engaging blade until released thereby, said blades being so pitched that the space between adjacent ends thereof is substantially less than the longitudinal width of said packages, whereby each next successive blade will engage the side of the foremost package being fed to position said blade in the path of travel of the next succeeding package to interrupt movement thereof, said packages being presented to said wheel by said belt, and means for intermittently rotating said index wheel.

3. The combination with a continuously moving conveyor belt for feeding a plurality of rectangular packages, of a rotary device for feeding said packages at a given rate and at spaced intervals, comprising an index wheel rotatably mounted adjacent said belt and having a plurality of equidistantly spaced blades arranged above said belt, said blades being engageable one at a time with said packages for periodically holding said packages against movement upon said belt until released thereby, said blades being so pitched that the space between adjacent ends thereof is substantially less than the longitudinal width of said packages, whereby each next successive blade will engage the side of the foremost package being fed to position said blade in the path of travel of the next succeeding package to interrupt movement thereof, and intermittent actuating means for rotating said wheel to release said packages one at a time.

4. The combination with a device for feeding rectangular packages from a single line alternately to a number of lines at a given rate and at spaced intervals, said device having a continuously moving feeder belt and a number of adjacent receiving belts substantially in line with said feeder belt, of a rotary index device for restraining packages from movement upon said feeder belt, comprising a vertical shaft arranged near the discharge end of said feeder belt, and index wheel mounted upon said shaft and disposed above feeder belt, said index wheel having a plurality of equidistantly spaced blades engageable one at a time with successive packages, the packages being fed to said wheel by the feeder belt and the foremost package being interrupted in its travel on said belt by the engaged blade until released thereby, said blades being so pitched that the space between adjacent ends thereof is substantially less than the longitudinal width of said packages, whereby each next successive blade will engage the side of the foremost package being fed to position said blade in the path of travel of the next succeeding package to interrupt movement thereof, a horizontally arranged follower shaft rotatably carried by said device, means connecting said vertical shaft and said follower shaft, a horizontally arranged rotating drive shaft carried by said table, and a Geneva mechanism connecting said drive shaft to said follower shaft to cause intermittent rotation of said index wheel to release only one package at a time.

5. The combination with a device for feeding rectangular packages from a single line alternately to a number of lines at a given rate and at spaced intervals, said device having a continuously moving feeder belt and a number of adjacent receiving belts substantially in line with said feeder belt, of a rotary index device for intermittently restraining packages from movement upon said feeder belt, comprising a vertical shaft arranged near the discharge end of said feeder belt, an index wheel mounted upon said shaft and disposed above feeder belt, said index wheel having a plurality of equidistantly spaced blades engageable one at a time with successive packages, the packages being fed to said wheel by the feeder belt and the foremost package being interrupted in its travel on said belt by the engaged blade until released thereby, said blades being so pitched that the space between adjacent ends thereof is substantially less than the longitudinal width of said packages, whereby each next successive blade will engage the side of the foremost package being fed to position said blade in the path of travel of the next succeeding package to interrupt movement thereof, a horizontally arranged follower shaft rotatably carried by said device, means connecting said vertical shaft and said follower shaft, a horizontally arranged rotating drive shaft carried by said table, a Geneva mechanism connecting said drive shaft to said follower shaft to cause intermittent rotation of said index wheel, a cam disc carried by said follower shaft, a deflector gate rotatably mounted at the discharge end of said feeder belt, and means connecting said deflector gate to said cam disc to alternately deflect said packages from said feeder belt to said receiving belts when released by said index means.

6. The combination with a device for feeding rectangular packages from a single line alternately to a number of lines at a given rate and at spaced intervals, said device having a continuously moving feeder belt and a number of adjacent receiving belts substantially in line with said feeder belt, of a rotary index device for intermittently restraining packages from movement upon said feeder belt, comprising a vertical shaft arranged near the discharge end of said feeder belt, an index wheel mounted upon said shaft and disposed above feeder belt, said index wheel having a plurality of equidistantly spaced blades engageable one at a time with successive packages, the packages being fed to said wheel by the feeder belt and the foremost package being interrupted in its travel on said belt by the engaged blade until released thereby, said blades being so pitched that the space between adjacent ends thereof is substantially less than the longitudinal width of said packages, whereby each next successive blade will engage the side of the foremost package being fed to position said blade in the path of travel of the next succeeding package to interrupt movement thereof, a horizontally arranged follower shaft rotatably carried by said device, means connecting said vertical shaft and said follower shaft, a horizontally arranged rotating drive shaft carried by said table, a Geneva mechanism connecting said drive shaft to said follower shaft to cause intermittent rotation of said index wheel, a cam disc carried by said follower shaft, an oscillating shaft rotatably carried by said device, a deflector gate carried by said oscillating shaft, an actuating rod operatively associated at one end with said cam disc, and means at the other end of said rod for connection with said oscillating shaft.

References Cited in the file of this patent

UNITED STATES PATENTS

| | | |
|---|---|---|
| 1,355,184 | Taliaferro | Oct. 12, 1920 |
| 1,747,465 | Cameron | Feb. 18, 1930 |
| 1,896,639 | Meyer | Feb. 7, 1933 |
| 2,090,129 | Kimball | Aug. 17, 1937 |
| 2,619,217 | Merrill | Nov. 25, 1952 |
| 2,646,869 | Kay | July 28, 1953 |
| 2,776,038 | Caldwell | Jan. 1, 1957 |
| 2,781,122 | Gueffroy | Feb. 12, 1957 |

FOREIGN PATENTS

| | | |
|---|---|---|
| 818,058 | France | June 7, 1937 |